United States Patent [19]

McMannis

[11] 4,135,246

[45] Jan. 16, 1979

[54] INTEGRATED HISTORY RECORDER FOR GAS TURBINE ENGINES

[75] Inventor: William T. McMannis, Springdale, Ohio

[73] Assignee: General Electric Company, Lynn, Mass.

[21] Appl. No.: 750,065

[22] Filed: Dec. 13, 1976

[51] Int. Cl.$^2$ .............................................. G01M 15/00

[52] U.S. Cl. ....................................... 364/551; 73/116; 364/506; 364/569

[58] Field of Search ............. 235/150.2, 150.53, 92 R, 235/92 M, 92 T, 92 TC; 73/116; 364/550, 551

[56] References Cited

U.S. PATENT DOCUMENTS

| | | | |
|---|---|---|---|
| 3,237,448 | 3/1966 | Howell et al. | 73/116 |
| 3,357,239 | 12/1967 | Hohenberg | 235/150.2 |
| 3,362,217 | 1/1968 | Evans et al. | 73/116 |
| 3,482,440 | 12/1969 | Curven | 73/116 |
| 3,527,086 | 9/1970 | Evans et al. | 73/116 |
| 3,584,507 | 6/1971 | Hohenberg | 73/116 |
| 3,593,012 | 7/1971 | Lang | 235/150.2 |
| 3,758,756 | 9/1973 | Johns | 73/116 |

*Primary Examiner*—Felix D. Gruber

*Attorney, Agent, or Firm*—Derek P. Lawrence; Henry J. Policinski

[57] ABSTRACT

An integrated history recorder for a gas turbine engine includes a number of integrally controlled displays which together provide a comprehensive record of accumulated engine life. The recorder is adapted to interface with an engine contained transducer assembly. Displays indicative of the following parameters are provided: the number of engine starts, engine running time, the number of engine turbine over-temperature occurrences, turbine time-temperature index, and a manually resettable flag which sets on occurrence of a turbine over-temperature event. These integrally controlled displays provide a comprehensive indication of the cumulative duty performed by the gas turbine engine.

10 Claims, 3 Drawing Figures

INTEGRATED HISTORY RECORDER FOR GAS TURBINE ENGINES

BACKGROUND OF THE INVENTION

The duty performed by an aircraft power plant has generally in the past been monitored by maintaining in a log book the number of hours of aircraft operation. Such records have customarily been used to obtain an indication when it is essential to overhaul the power plant. Not only are such prior art practices subject to error due to inaccuracies in the manual record keeping, but also such methods do not give a reliable indication of the extent of work performed by the aircraft power plant. Further, in some conditions of service, such as when operating in a hostile environment it is not practical to maintain accurate records of aircraft operation.

It has thus been proposed to equip an aircraft engine with a temperature-time integrating counter to provide an automatic and more reliable indication of the actual duty performed by the engine. This improved accuracy results from the fact that the rate of consumption of the operating life of a gas turbine engine is proportional to the product of the temperature at which it operates and the duration of that temperature. While such devices provide improved measure of consumed engine operating life there remains room for improvement for such devices. In particular, other criteria exists on which a judgment may be made as to whether an aircraft engine should be removed for overhaul.

OBJECT OF THE INVENTION

It is therefore the primary object of this invention to provide an integrated history recorder for a gas turbine engine which includes a plurality of integrally controlled displays which together provide a comprehensive indication of the duty performed by the engine.

SUMMARY OF THE INVENTION

This and other objects of this invention have been achieved in the preferred embodiment of the invention wherein an integrated history recorder for a gas turbine engine is provided with a plurality of integrally controlled displays which together provide comprehensive indication of accumulated engine duty.

The displays include a first counter which records the number of times engine speed transitions a predetermined range, indicative of the number of engine starts; a second counter which accumulates engine run time during the speed range, indicative of total engine run time; a time-temperature integrating counter which accumulates a count representative of the integrated value of engine run time and gas turbine engine temperature to provide a time-temperature index; an over-temperature counter which accumulates the number of times the gas turbine exhaust temperature exceeds a predetermined referenced temperature for a specified duration, indicative of turbine over-temperature, and an over-temperature flag which is set when the over-temperature counter is operated and remains set until manually reset.

An engine located transducer assembly is used to sense necessary engine control parameters and transmit them to the integrated history recorder.

BRIEF DESCRIPTION OF THE DRAWINGS

This invention may be better understood upon reading the following description of the preferred embodiment in conjunction with the accompanying drawings wherein.

DESCRIPTION OF THE PREFERRED EMBODIMENT

Figure 1:
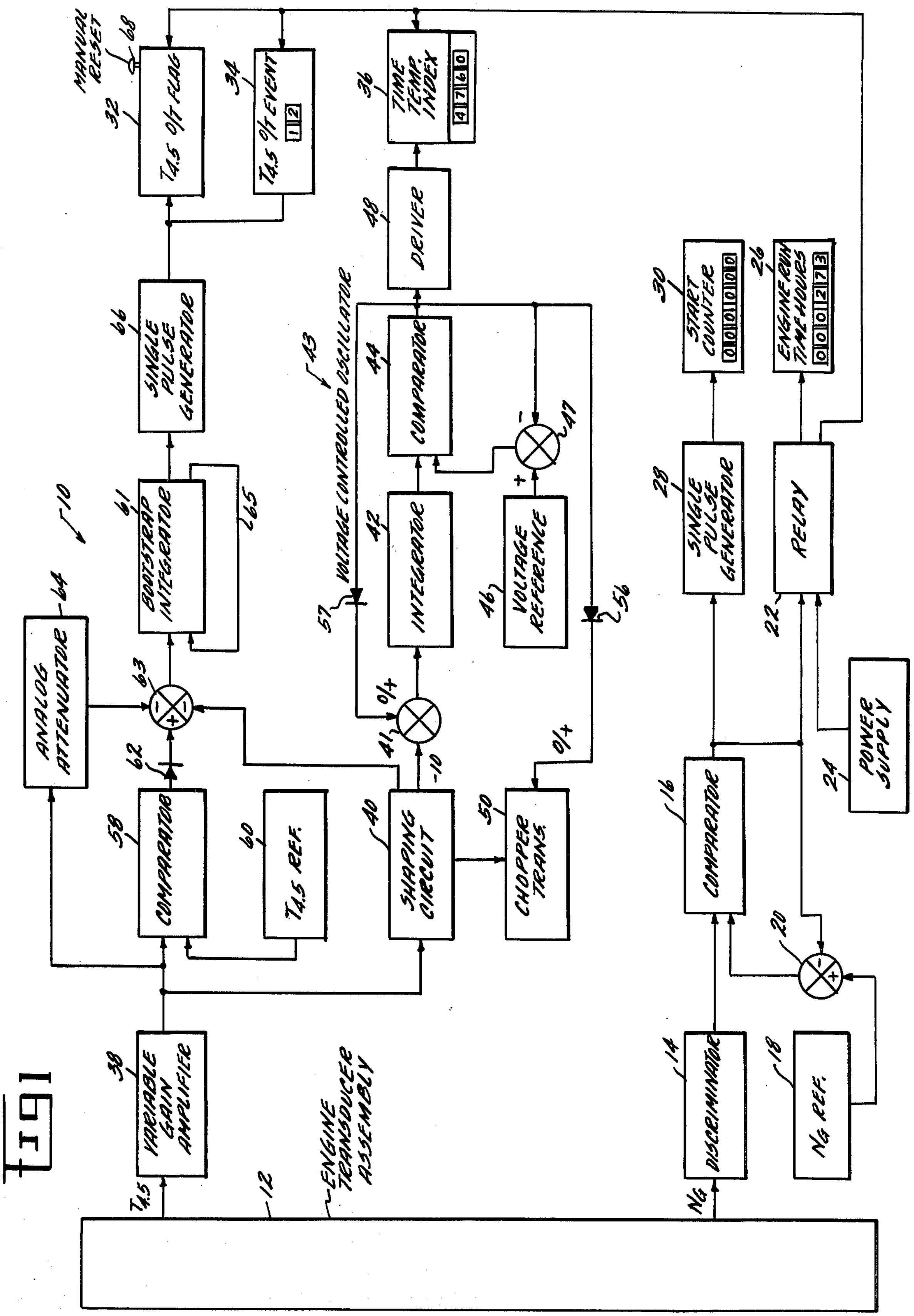
FIG. 1 is a schematic diagram in block format illustrating the integrated history recorder of this invention.

Referring to FIG. 1 therein is shown a block diagram of the history recorder of this invention shown generally at 10. An engine transducer assembly 12 is provided in the engine to sense control parameters which are input to the history recorder 10. These parameters include gas generator speed $N_G$ and turbine exhaust temperature T4.5. The transducer assembly 12 outputs a constant amplitude square wave with a 50 percent duty cycle having a frequency proportional to the speed of the engine gas generator. This signal is input to a discriminator circuit 14 in the history recorder 10 which converts the analog frequency to an analog voltage. The resultant analog voltage is thereafter input to a comparator circuit 16. Also input to comparator circuit 16 is a reference analog voltage 18 which corresponds to 50 percent of rated maximum gas generator speed. The comparator circuit 16 compares the analog voltage input from the discriminator 14 with the reference voltage and produces an output when the voltage received from the discriminator 14 exceeds the reference voltage 18. The output from comparator circuit 16 is fed back to a summing junction 20 to shift the reference voltage from a value representing 50 percent rated maximum gas generator speed to a value representing 30 percent of rated maximum gas generator speed. This feedback also acts as hysteresis to prevent oscillation of the comparator 16. Connected in this manner comparator 16 will output a signal only when the speed signal from the discriminator 14 exceeds 50 percent of rated maximum generator speed and thereafter will be turned off only when the speed signal from discriminator 14 falls below 30 percent of rated maximum gas generator speed. The output from comparator circuit 16 is also connected to energize a relay 22 and thereby connect the output from a power supply 24 to an engine run time display circuit 26. Engine run time display circuit 26 contains a sychronous motor of the type well-known in the art which when energized drives a reduction geartrain at a fixed rate to turn a digital counter and provide an accumulative indication of engine running time. The output from comparator circuit 16 is also input to the enable line of a single pulse generator 28 which outputs a pulse to a start counter 30. In this manner, start counter 30 will register a start each time the output from comparator circuit 16 changes. Thus, whenever the gas generator speed falls below 30 percent of rated maximum gas generator speed and thereafter exceeds 50 percent of rated maximum gas generator speed an engine start will be registered in start counter 30. The 30% and 50% values of gas generator speed were selected as being indicative of normal transients expected during start of a typical gas turbine engine. It not being expected that speeds below 30% maximum gas generator speed will be encountered during normal engine operation and that the engine when started from an off condition will not start unless 50% maximum gas generator speed is achieved. A start condition is not registered prior to obtaining 50% maximum gas generator speed to prevent false starts from registering. As will be apparent to those skilled in the art other percentages of maximum gas generator speed indicative of the particular engine in which the recorder is located may be used without departing from the scope of this invention.

Relay 22 also connects the output of power supply 24 to energize the over-temperature event flag 32, the over-temperature event counter 34, and the time-temperature index counter 36. These circuits are thus inoperative below 30 percent rated maximum gas generator speed and do not become active until a start condition has been sensed by comparator 16.

Engine transducer assembly 12 also outputs a DC analog voltage proportional to the turbine exhaust temperature to a variable gain conditioning amplifier 38. The output voltage from transducer assembly 12 is zero volts DC at a first temperature (for example T4.5 = 850° C) and changes by a specified amount with a change in turbine exhaust temperature (for example 50 millivolts per degree centigrade). Amplifier 38 conditions and scales the analog voltage by inverting and biasing it to provide zero volts output with turbine exhaust temperature equal to a temperature at which consumption of turbine life is considered negligible (for example: 740° C) and thereafter provides unity gain up to a specified first temperature (for example, 860° C) and a 4-1 gain at temperatures exceeding this specified temperature. This variable gain feature of amplifier 38 is required to maintain the relatively wide non-linear range of the time and temperature integrator schedule as will be seen in discussions below.

Figure 2:
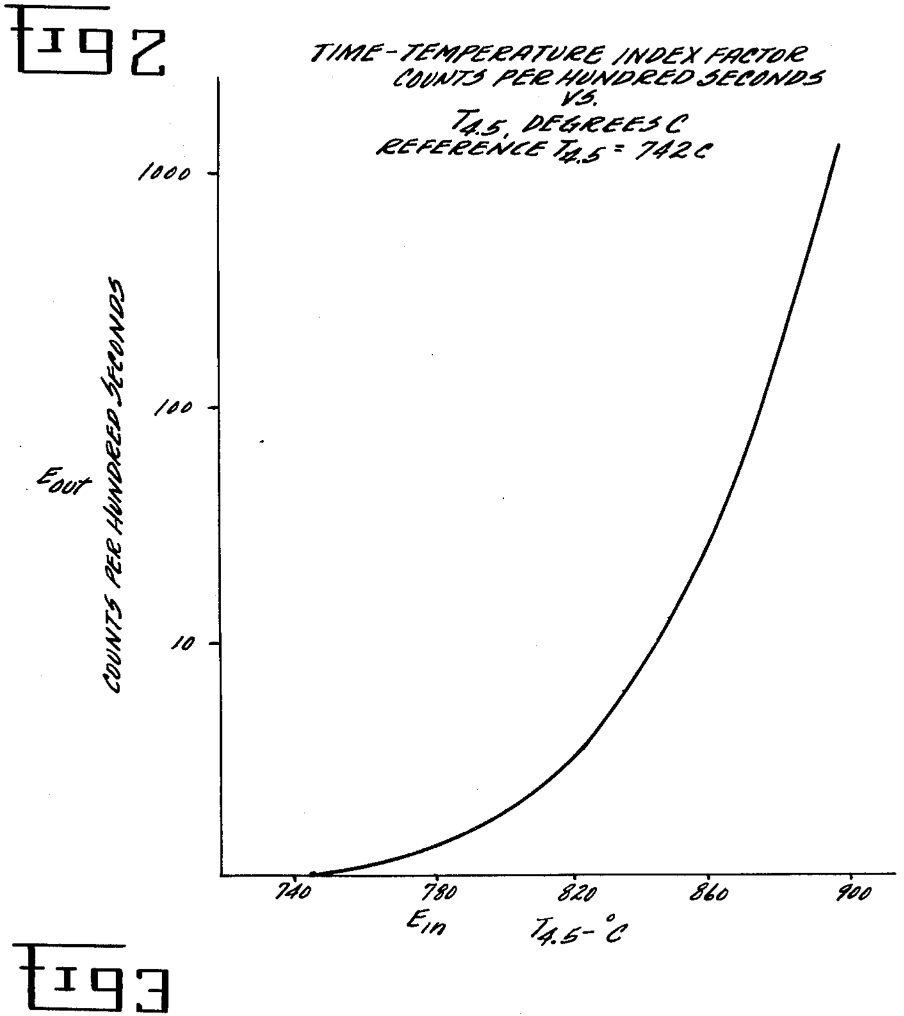
FIG. 2 is a graph illustrating the response of an amplifier and shaping circuit used in the history recorder of this invention.

The output from amplifier 38 is directed to a shaping circuit 40 which shapes the output of amplifier 38 to provide a response which approximates the instantaneous rate of consumption of the life of the gas turbine with temperature. A typical response for amplifier 38 and shaping circuit 40 is shown in FIG. 2 where the input voltage is referenced in corresponding turbine inlet temperature values and the output voltage is represented at a corresponding index count rate for time-temperature index counter 36. As can be seen from this diagram the rate of consumption of turbine life increases significantly at higher turbine temperatures. The gain of amplifier 38 is set to approximate this phenomenon thus: amplifier 38 may be set to a first gain approximating the rate of consumption of turbine life at lower temperatures and a second gain approximating the rate of consumption of turbine life at higher temperature. For an engine having the rate of consumption defined by the graph of FIG. 2, amplifier 38 may be set to unity gain at voltages representing temperatures below 870° C and a 4-1 gain at higher voltages.

The output of the shaping circuit 40 is directed through a summing junction 41 to a voltage-controlled oscillator shown generally at 43 which comprises an analog integrator 42 followed by an analog comparator 44. The signal from the shaping circuit 40 is negative in polarity in the range of turbine exhaust temperatures which represent non-negligible consumption of gas turbine engine life. This polarity causes the output of integrator 42 to change in the positive polarity direction at a rate in proportion to the magnitude of the negative voltage at the input. The output of integrator 42 is directed to a comparator 44 which compares the voltage received with a corresponding voltage from a voltage reference 46. The voltage reference 46 inhibits the comparator from turning on until it is exceeded by the output from integrator 42. The voltage reference 46 is set at a value which is sufficient to provide a pulse of sufficient duration to operate the time-temperature integrating counter 36. (For example, a value of + 10V will be sufficient to produce a 100 millisecond pulse period as described below). When the voltage input from the integrator 42 exceeds the reference voltage 46 the output from comparator 44 is fed back through a summing junction 47 to modify the reference voltage 46 to a value which will require the output from integrator 42 to return to a smaller value; for example, −10 volts, before the comparator turns off. This feedback also acts as hysteresis to prevent oscillation of the time-temperature integrator circuit. The on-period of the comparator 44 is used to provide a pulse; for example, 100 milliseconds, through a driver circuit 48 to operate the time-temperature digital counter 36. The period of the pulse output from the comparator 44 is controlled by turning off the input signal from the shaping circuit 40 to the integrator 42 with a chopper transistor 50. The on voltage of comparator 44 is output through a diode 56 to activate the chopper circuit 50. The positive on-voltage of comparator 44 is also output through a diode 57 to the input of the integrator circuit 42, through summing point 41 and thereby cause the voltage output from integrator 42 to go negative. When the voltage from integrator 42 reaches the new reference voltage (now at −10 volts) comparator 44 will turn off thereby removing the output from comparator 44 and resetting the voltage reference 46 to its original +10 volts value. In addition, the reset signals input through the diodes 56 and 57 go to zero inhibiting chopper transistor 50 and removing the reset signal from summing junction 41 thereby permitting the integrator 42 to integrate the output from the shaping circuit 40 and turn on when the +10 reference voltage is reached. Amplifier 38 may be set to saturate in a minus polarity direction to prevent pulsing digital counter 36 faster than the specified response rate. The above process is repeated as long as the integrated time-temperature value output from integrator 42 exceeds the voltage reference 46. When T4.5 falls below the negligible temperature the output from amplifier 38 is inhibited thereby preventing stepping of the time-temperature index counter 36.

Figure 3:
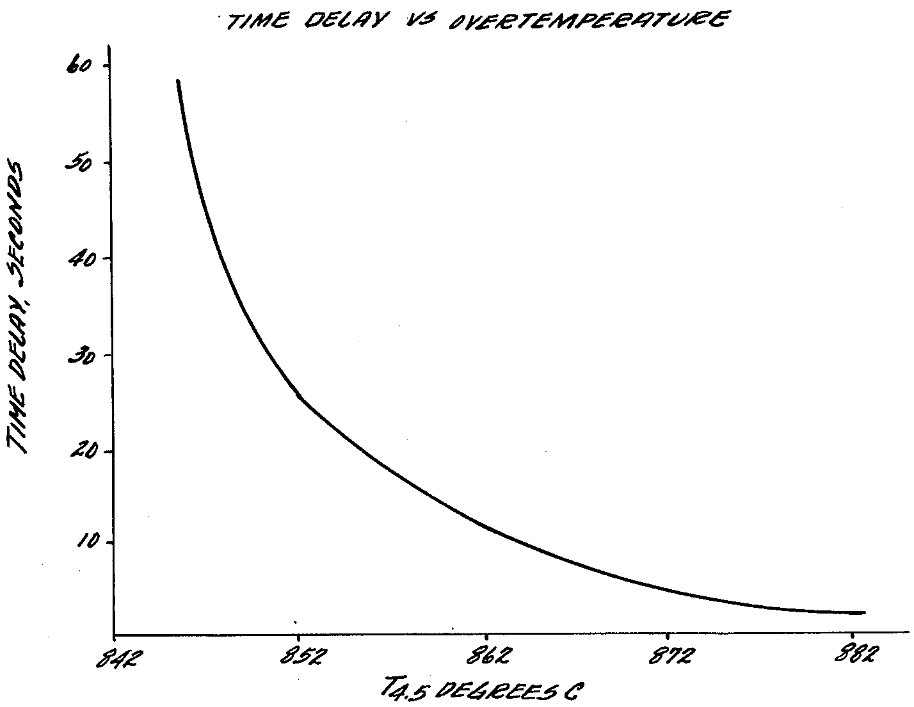
FIG. 3 is a graph of the response of a time delay integrator used in the history recorder of this invention.

The turbine exhaust temperature voltage output from amplifier 38 is also input to an over-temperature event delay circuit which comprises a comparator 58 which unlike the comparators 16 and 44 has no hysteresis. Comparator 58 compares the voltage output from amplifier 38 with a reference voltage 60 corresponding to a maximum turbine exhaust temperature at which an over-temperature event is desired to be recorded (for example 847° C). The comparator 58 remains on during all time periods in which the temperature from amplifier 38 is below the reference temperature and conducts a positive signal through a diode 62 to a summing junction 63 at the input of an analog bootstrap integrator 61. The output of diode 62 is summed at the junction 63 with the output from the shaping circuit 40 and the output from an analog attenuator circuit 64. Bootstrap integrator 61 having a response as shown in FIG. 3 receives inputs from summing junction 63 and integrates that voltage at a rate which is proportional to the magnitude of the input voltage received from amplifier 38 such that at relatively high temperatures corresponding to turbine over-temperatures the integrator 61 will integrate rapidly from minus saturation to zero and at relatively low temperatures the output from integrator 61 will go towards zero at a much slower rate.

When the comparator 58 is on, the negative signal from shaping circuit 40 and analog attenuator 64 are effectively cancelled out by the signal from comparator 58 causing the output of bootstrap inverting integrator 61 to remain at negative saturation. When the comparator 58 is turned off by the voltage from amplifier 38 exceeding the voltage from reference voltage 60, the negative inputs from shaping circuit 40 and analog attenuator 64 are input to the integrator 61 causing its output to change in a positive polarity direction at a rate directly proportional to magnitude of the summed negative input. Bootstrap integrator 61 is of the type well-known in the art which includes positive feedback on line 65 between its output and input. When the output of bootstrap integrator 61 passes zero going from negative to positive the positive voltage at its output is conducted back to the input to cause the integrator output to snap quickly to positive saturation. The snap change of the integrator output forms the required input to trigger the single pulse generator 66. Pulse generator 66 when triggered provides a pulse of predetermined duration to increment the over-temperature counter 34 and set the over-temperature flag 32. Integrator 61 will not return to negative saturation until comparator 58 has been turned on by the input voltage from amplifier 38 falling below the reference voltage level 60. The over-temperature event comparator 58 includes no hysteresis so that in the event an over-temperature condition does not last a sufficient amount of time to provide an integrated output from delay integrator 64 which is sufficient to drive integrator 61 into positive saturation, no over-temperature event will be recorded. This prevents transient over-temperature conditions which do not last a sufficient time to cause excessive engine wear from registering in the event counter 34 or setting the flag 32. A new count will be registered in event counter 34 each time the turbine temperature transitions the reference temperature voltage 60 for a sufficient time to permit integrator 61 to snap into positive saturation. The over-temperature flag 32 will remain set until manually reset by the manual reset button 68.

The history recorder of this invention thus provides a comprehensive indication of the duty performed by an aircraft power plant. Various changes could be made in the disclosed embodiment without departing from the scope of this invention. Thus while the circuit disclosed has been scaled to monitor specific temperatures and speeds indicative of the rate of consumption of the life of a particular gas turbine engine, these circuits may be readily adapted to monitor other aircraft power plants by rescaling.

Therefore, having described a preferred embodiment of the invention, though not exhaustive of all possible equivalents, what is desired to be secured by Letters Patent of the United States is claimed below:

1. A history recorder for providing a record of the duty performed by a gas turbine wherein said recorder includes a plurality of integrally controlled displays each providing a display of a unique factor determinative of the duty performed by the engine, the invention comprising:

means for displaying accumulated engine run time;

means for generating an engine speed signal indicative of engine speed; and comparator means for comparing said engine speed signal with first and second reference speed signals, said first reference speed signal being indicative of a reference speed greater than said second reference speed, said comparator means operative to provide an output signal initiated in response to a comparison of said first reference signal with said engine speed signal and terminated in response to a comparison of said second reference signal with said engine speed signal, said engine run time display means providing a run time indication in response to said output signal.

2. The history recorder of claim 1 further including engine start display means for providing an indication of the number of engine starts in response to each said initiation of said output signal.

3. The history recorder of claim 1 further including means for displaying a turbine time-temperature index representative of the integrated value of turbine temperature running time in response to the presence of said output signal to provide a comprehensive indication of engine duty cycle.

4. The history recorder of claim 3 wherein said index display means comprises:

variable gain amplifier means for receiving the turbine engine exhaust temperature signal from said engine transducer assembly and scaling and biasing said signal to provide a zero volt output at a first temperature at which the consumption of gas turbine engine life is considered negligible and thereafter providing a first gain in a first voltage range and a second gain in a second voltage range exceeding said first voltage range.

5. The history recorder of claim 4 wherein said index display means further comprises shaping circuit means for receiving the output from said variable gain amplifier means and producing an output proportional to the instantaneous rate of consumption of the life of the gas turbine engine with temperature.

6. The history recorder of claim 1 further including means for displaying the number of turbine over-temperature occurrences in response to said initiation of said output signal to provide a comprehensive indication of engine duty cycle.

7. The history recorder of claim 1 further including a manually resettable flag which sets on occurrence of a turbine temperature event said flag being enabled upon initiation of said output signal and disabled upon termination of said output signal.

8. For use in a history recorder for providing a record of the duty of a gas turbine engine wherein said recorder includes means for providing a display of accumulated engine run time over a speed range defined by an upper speed and a lower speed, means for displaying the number of engine starts, means for displaying the number of turbine over-temperature occurrences and means for displaying an index representative of the integrated value of turbine temperature and running time, the invention wherein said accumulated engine run time display means comprises:

means for generating a gas generator speed signal;

discriminator means for converting said speed signal to an analogue signal;

a reference voltage corresponding to said upper speed;

comparator means for comparing said discriminator voltage with said reference voltage and generating an output when said discriminator voltage exceeds said reference voltage;

feedback means for transmitting said comparator output to reduce the reference voltage to a value corresponding to said lower speed range whereby said comparator output signals are removed when said discriminator voltage falls below the reduced reference voltage;

power supply means;

digital counter means for accumulating elapsed time when connected to said power supply means; and relay means activated by said comparator output for connecting the power supply to the digital counter whereby engine run time is accumulated in said digital counter during the time signals are present at said comparator output.

9. The history recorder of claim 8 wherein said relay means in response to output of the comparator also connects the power supply means to enable the over-temperature occurrence display means, the index display means and the over-temperature flag.

10. The history recorder of claim 9 wherein the output of said comparator is input to a single pulse generator means for generating a pulse to step the number of starts displayed by said start display means when the comparator output changes from off to on.

* * * * *